United States Patent
Borror et al.

[11] 3,861,920
[45] Jan. 21, 1975

[54] SUPER-SENSITIZING DYE COMBINATION IN SILVER HALIDE EMULSIONS

[75] Inventors: Alan L. Borror, Lexington; Ruth Linda Hill, Cambridge; Jerome L. Reid, Wayland, all of Mass.

[73] Assignee: Polaroid Corporation, Cambridge, Mass.

[22] Filed: Jan. 2, 1974

[21] Appl. No.: 430,223

[52] U.S. Cl............ 96/77, 96/3, 96/29 D, 96/124, 96/137
[51] Int. Cl............ G03c 1/40, G03c 1/14
[58] Field of Search ........... 96/124, 137, 77, 29 D

[56] References Cited
UNITED STATES PATENTS

| | | | |
|---|---|---|---|
| 2,983,606 | 5/1961 | Rogers | 96/3 |
| 3,580,724 | 5/1971 | Sato et al. | 96/124 |
| 3,663,210 | 5/1972 | Sato et al. | 96/124 |
| 3,729,319 | 4/1973 | Jefferson et al. | 96/124 |
| 3,769,024 | 10/1973 | Sakazume et al. | 96/124 |
| 3,799,783 | 3/1974 | Hill et al. | 96/124 |

*Primary Examiner*—J. Travis Brown
*Attorney, Agent, or Firm*—Mart C. Matthews

[57] ABSTRACT

A photosensitive silver halide emulsion is disclosed which is spectrally sensitized with a dye combination comprising a symmetrical benzoxazolocarbocyanine dye of the formula:

I.

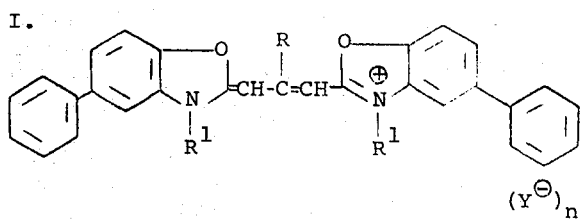

wherein R represents hydrogen or a lower alkyl group possessing from 1 to 3 carbon atoms, inclusive; and each $R^1$ represents a carboxyalkyl or sulfoalkyl group possessing from 1 to 4 carbon atoms, inclusive, in the alkylene chain; Y represents an anion; and $n$ represents 0 or 1, with $n=0$ in the inner salt form of the dye; and an unsymmetrical benzimidazolocarbocyanine dye of the formula:

II.

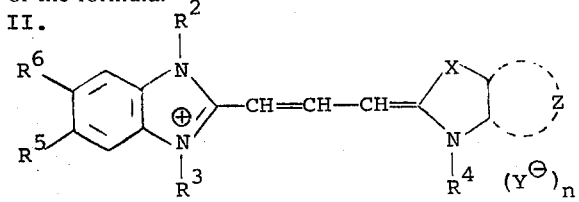

wherein Y and $n$ possess the same meaning as in Formula I; X is S or Se; $R^2$ is a lower alkyl group possessing from 1 to 3 carbon atoms inclusive; $R^3$ and $R^4$ are the same or different and represent a carboxyalkyl or sulfoalkyl group, each possessing from 1 to 4 carbon atoms, inclusive, in the alkylene chain, or a lower alkyl group, with at least one of $R^3$ and $R^4$ being said carboxyalkyl or sulfoalkyl group; $R^5$ is halogen, cyano, or lower carboxyalkyl; $R^6$ is hydrogen or halogen; and Z represents the non-metallic atoms necessary to complete a benzothiazole or benzoselenazole nucleus.

11 Claims, 1 Drawing Figure

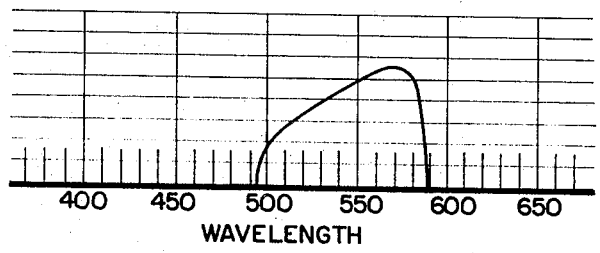

SUPER-SENSITIZING DYE COMBINATION IN SILVER HALIDE EMULSIONS

BACKGROUND OF THE INVENTION

1. Field of the Invention

This invention deals with photography and, more particularly, with products and processes wherein photosensitive silver halide emulsions are spectrally (optically) sensitized to the green region of the visible spectrum.

2. Description of the Prior Art

Those skilled in the photographic art are aware that the photoresponse of an ordinary silver halide emulsion is generally limited to the blue and violet regions of the visible spectrum. However, it has been found that the addition of certain cyanine and related dyes to a silver halide emulsion extends the emulsion's photoresponse approximately to the spectral regions absorbed by said dyes, when said dyes are absorbed onto the surface of the silver halide crystal. The cyanine dyes are those conforming to an amidinium ion system in which both nitrogen atoms are included in separate heterocyclic ring systems and in which the conjugated chain joining the nitrogen atoms passes through a part of each heterocyclic ring.

Sensitizing dyes of the above type are normally distributed uniformly throughout a washed, finished emulsion in concentrations depending on the sensitometric characteristics of the particular emulsion and the effects desired.

Common photographic practice is to incorporate the dye into the silver halide emulsion at that concentration producing the maximum sensitization. Typically, this incorporation begins with a quantity of dye being dissolved in a low molecular weight organic solvent such as methanol, acetone or pyridine. A volume of the solution thus prepared, is slowly added with stirring to an ordinary flowable silver halide emulsion until the dye is thoroughly dispersed in the emulsion. The sensitized emulsion may then be coated, exposed and developed according to usual photographic techniques.

Symmetrical benzoxazolocarbocyanine dyes, such as those represented by Formula I herein, are known to be useful for the green sensitization of silver halide photographic emulsions since they generally possess maximum absorption of light at wavelengths from about 530 nm to about 550 nm. However, since the green region of the spectrum extends beyond this range to about 600 nm, it has been found necessary to seek other dyes which can combine with the benzoxazolocarbocyanine dye to provide the desired sensitization over this wider spectral region.

In the prior art, the known combinations of sensitizing dyes which are appropriate for optical sensitization have been relatively few. Many combinations tend to fog the silver halide emulsion or adversely interact with other photographic additives, particularly upon storage. For example, certain image-forming materials such as dyes which are also silver halide developing agents. i.e., dye developers, have exhibited a propensity for effecting desorption of some sensitizing dyes from effective sensitizing contact with photosensitive silver halide crystals. Other combinations of dyes may not result in a desirably uniform and continuous extension of the green sensitivity. In many cases, the speed may tend to fall short of preferred levels for certain recording applications, particularly at the longer wavelengths. As examples of sensitizing combinations described in the prior art involving symmetrical benzoxazolorcarbocyanine dyes, mention may be made of U.S. Pat. Nos. 2,688,545 (in combination with a symmetrical benzimidazolocarbocyanine dye); 3,580,723 (in combination with a naphtho-oxacarbocyanine dye); 3,580,724 (in combination with an unsymmetrical oxacarbocyanine dye); 3,663,210 (in combination with a carboxyalkyl-substituted oxacarbocyanine dye); and 3,729,319 (in combination with a simple 2'-cyanine dye and an unsymmetrical oxacarbocyanine dye).

The present invention provides improved photographic emulsions and elements sensitized with a novel combination of sensitizing dyes which does not exhibit the above-described deficiencies of prior art combinations.

BRIEF SUMMARY OF THE INVENTION

We have now discovered that highly desirable and unexpectedly stable sensitivity to the green region of the spectrum is imparted to silver halide by a combination of sensitizing dyes comprising a symmetrical benzoxazolocarbocyanine dye of the formula:

I.

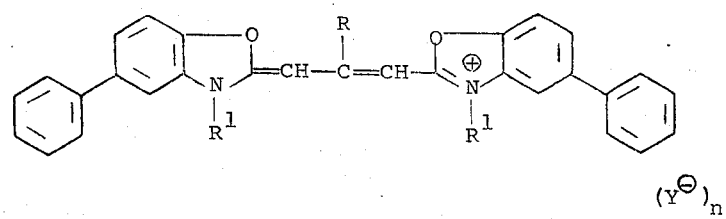

wherein R represents hydrogen or a lower alkyl group; each $R^1$ represents a carboxyalkyl or sulfoalkyl group possessing from 1 to 4 carbon atoms, inclusive, in the alkyl chain, (e.g., carboxymethyl, carboxyethyl, sulfoethyl, γ-sulfopropyl, γ-sulfobutyl, Δ-sulfobutyl, etc.); Y represents an anion customary in the cyanine dye art; and n represents 0 or 1, with $n=0$ in the inner salt form of the dye; and an unsymmetrical benzimidazolocarbocyanine dye of the formula:

II.

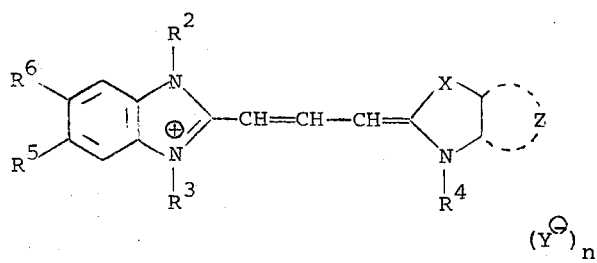

wherein Y and $n$ possess the same meaning as in Formula I; X is S or Se; $R^2$ is a lower alkyl group; $R^3$ and $R^4$ are the same or different and represent a carboxyalkyl or sulfoalkyl group each possessing from 1 to 4 carbon atoms inclusive, in the alkylene chain, or a lower alkyl group, with at least one of $R^3$ and $R^4$ being said carboxyalkyl or sulfoalkyl group; $R^5$ is halogen (e.g., —Cl, —Br, —F), cyano, or lower carboxyalkyl; $R^6$ is hydrogen or halogen; and Z represents the non-metallic atoms necessary to complete a benzothiazole or benzoselenazole nucleus. Z may include substituents on the nucleus, preferably in the 5-position, such as, for example, halogen, lower alkyl, lower carbalkoxy (e.g.,

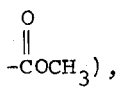

lower alkoxy (e.g., —OCH₃), acetamido (e.g.,

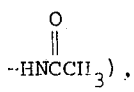

etc.

The combination of the present invention has been found to be particularly useful when employed to spectrally sensitize a silver halide emulsion which has associated therewith an appropriate color-providing material, e.g., a magenta dye developer compound which contains, in the same molecule, both the chromophoric system of a dye and also a silver halide developing function, in a photographic element wherein color reproduction is provided by diffusion transfer techniques.

BRIEF DESCRIPTION OF THE DRAWING

The drawing annexed hereto comprises a graphic representation of the spectral response characteristics of a photosensitive silver halide emulsion spectrally sensitized in accordance with an embodiment of the present invention, the details of which are set forth hereinafter.

DETAILED DESCRIPTION OF THE INVENTION

As used in this specification and in the appended claims, the term "unsymmetrical benzimidazolocarbocyanine dye" designates a cyanine dye having an amidinium ion system in which one of the nitrogen atoms is included within a benzimidazole heterocyclic ring system and the other is included within a benzothiazole or benzoselenazole heterocyclic ring system, and in which the conjugated bridge between said heterocyclic nuclei comprises a trimethine linkage. The term "symmetrical benzoxazolocarbocyanine dye" refers to a cyanine dye wherein the conjugated bridge comprises the aforementioned trimethine linkage and both of the heterocyclic nuclei are of the benzoxazole series.

The term "lower" whenever used herein including the claims, denotes a group having a hydrocarbon chain of from 1 to 3 carbon atoms inclusive. Thus, when reference is made to lower alkyl, this term is intended to include methyl, ethyl and propyl; the term "lower alkoxy" is intended to include methoxy, ethoxy and propoxy; the term "lower carbalkoxy" is intended to include carbmethoxy, carbethoxy and carbpropoxy; and so forth. The term "halogen" is intended to include the substituents —Cl, —Br, —F and —I.

The anion, represented by the designation Y in Formulae I and II, comprises those anionic acid radicals customarily used in the cyanine dye art when $n=1$, for example, chloride, bromide, iodide, methylsulfate, ethylsulfate, p-toluenesulfonate, benzenesulfonate, acetate, propionate, cyanate, perchlorate, etc. The most preferred dyes of Formulae I and II are those which have no "external anion", i.e., $n=0$, but instead exhibit an "internal salt" form wherein the anion is the negatively charged form of the sulfoalkyl or carboxyalkyl group represented by $R^1$, $R^3$ or $R^4$ and the cation is the positive charge shared between the terminal nitrogens of the amidinium ion system. This form is also referred to as the "betaine," "zwitterion," or "anhydro" form. It should be understood that all formulae set forth herein, including those in the claims, represent only an illustration of one form of structure and that the actual cyanine dyes involved are resonance hybrids of a series of structures according to principles well known in the art.

As briefly mentioned before, $R^1$, $R^3$ and $R^4$ in Formulae I and II may individually represent carboxyalkyl or sulfoalkyl groups having from 1 to 4 carbon atoms such as, for example, carboxymethyl, carboxyethyl, sulfoethyl, γ-sulfopropyl, γ-sulfobutyl, Δ-sulfopropyl, etc. It is to be appreciated that the charge distributions shown in the formulae are merely illustrative of a resonance system as just described, and that the acid hydrogen of the acid groups shown in the formulae may be readily replaced by an appropriate cation, for example, an alkali metal ion, triethylammonium, etc.

In Formulae II, either or both $R^3$ and $R^4$ may be sulfoalkyl or carboxyalkyl. Preferably one of $R^3$ and $R^4$ is lower alkyl and the other is sulfoalkyl, and most preferably, $R^4$ is sulfobutyl or sulfopropyl and $R^3$ is ethyl. For further description of preferred sensitizing dyes within Formulae II, reference may be had to copending application Ser. No. 430,222, filed Jan. 2, 1974.

From the description hereinafter, it will be appreciated that a requisite function of the dye sensitizers of the present invention is that they be nonmigratory — for were they to diffuse, they might provide a chromatically deleterious effect to the ultimate image formed. In general, the migration propensities of the denoted sensitizers may best be controlled by choosing appropriate alkylene groups within the groups $R^1$, $R^3$ and $R^4$ of Formulae I and II. Furthermore, it has been found that sensitized silver halide emulsions utilizing cyanine dye materials of the herein denoted class do not lose spectral sensitization, i.e., are not antisensitized, in the presence of dye developers and other materials commonly utilized in diffusion transfer photographic systems.

In general, the carbocyanine sensitizing dyes of Formulae I and II may be readily synthesized in accordance with the conventional procedures of the art for the production of such compounds. For example, the procedure for the synthesis of the dyes of Formula I may comprise condensing a quaternary compound of the formula:

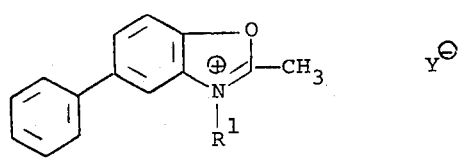

in the presence of a basic condensing agent with the orthoester of a carboxylic acid. The procedure for the synthesis of the dyes of Formula II may comprise condensing a quaternary compound of the formula:

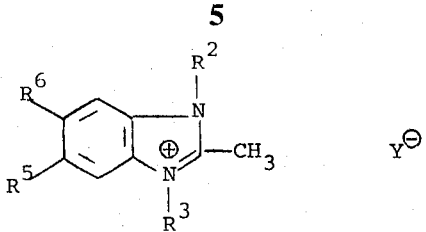

with an amidine such as N,N-diphenylformamidine, to form the anilino compound; reacting the latter with sodium hydroxide to form the imino compound, condensing the resultant quaternary compound with sulfonyl chloride, and then condensing the resultant quaternary compound with a second quaternary compound of the formula:

III.

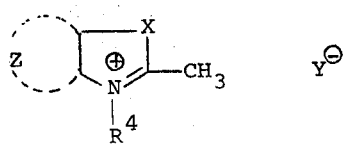

in the presence of a basic condensing agent.

The aforementioned basic condensing agent may comprise an organic amine, for example, tri-n-propylamine, tri-n-butylamine, triisoamylamine, triethylamine, trimethylamine, dimethylaniline, diethylaniline, pyridine, N-alkylpiperidine, etc., and most preferably an organic tertiary amine having a dissociation constant greater than pyridine ($1 \times 10^{-5}$); an alkali metal carboxylate in a carboxylic anhydride, for example, sodium acetate in acetic anhydride; etc.; or an alkali metal hydroxide, for example, sodium hydroxide, potassium hydroxide, etc. Preferably, the stated condensation reaction takes place in the presence of heat and in a substantially inert reaction medium such as a lower molecular weight alcohol, for example, ethyl, n-propyl, isopropyl, n-butyl or isobutyl alcohol or methoxy ethanol; tricresylphosphate; or a phenol; or a reaction medium itself comprising the condensing agent such as pyridine. A preferred reaction medium is 2-methoxy ethanol (i.e., Methyl Cellosolve and is the subject matter of copending application Ser. No. 472,274, filed May 22, 1974.

As examples of the aforementioned orthoesters of carboxylic acids, mention may be made of ethylorthoacetate, ethylorthopropionate, etc.

Particularly preferred dyes of Formula I may be represented by the formula:

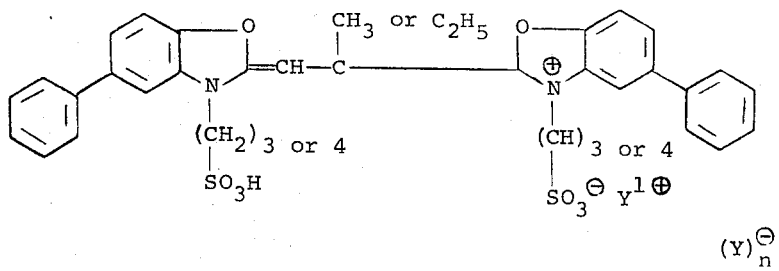

wherein $Y^1$ is a cation or hydrogen and Y and $n$ are as previously defined.

Particularly preferred dyes of Formula II may be represented by the formula:

IV.

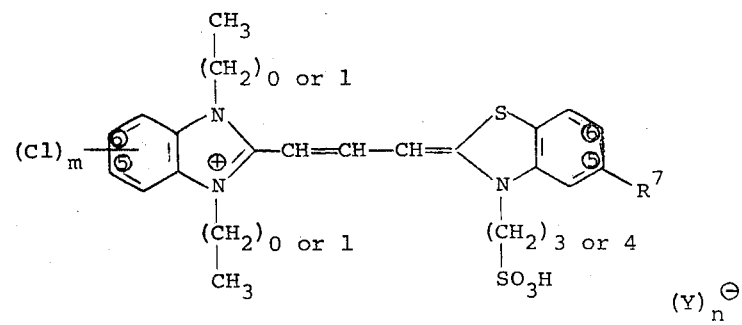

wherein $m$ is 1 or 2 and the Cl is in position 5- or 5- and 6- of the benzimidazole nucleus; $R^7$ is hydrogen, lower alkyl or lower alkoxy; and Y and $n$ have the definitions previously given.

Examples of specific dyes contemplated by Formula II include the following:

V.

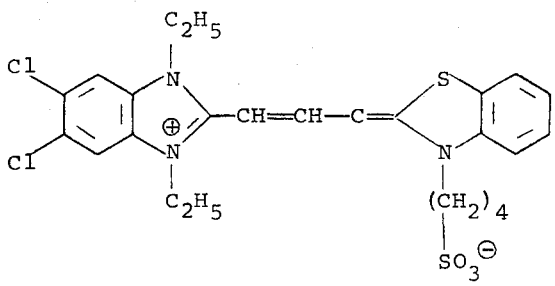

VI. 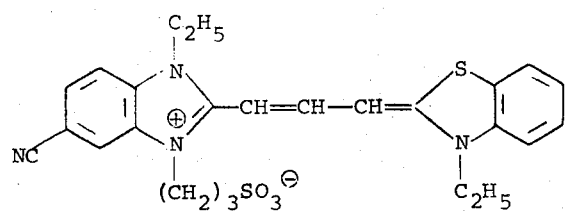
VII. 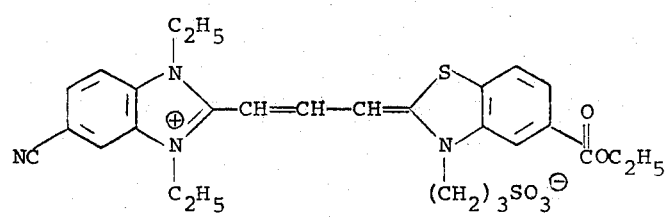
VIII. 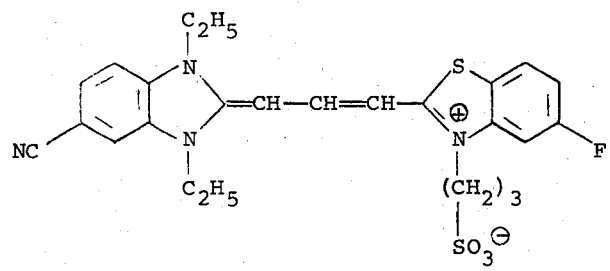
IX. 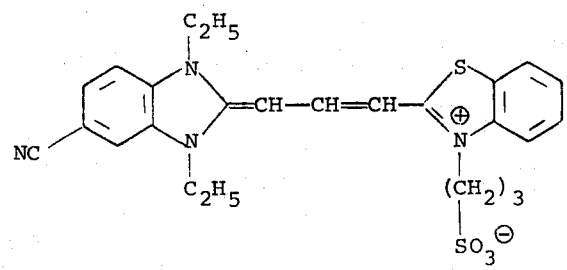
X. 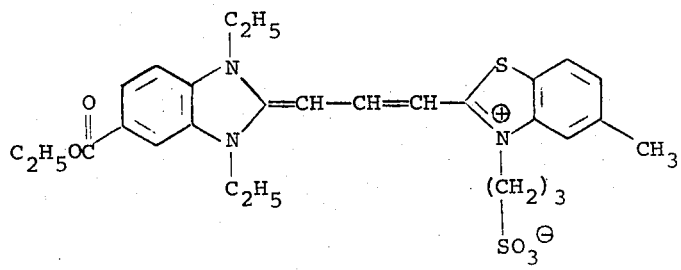
XI. 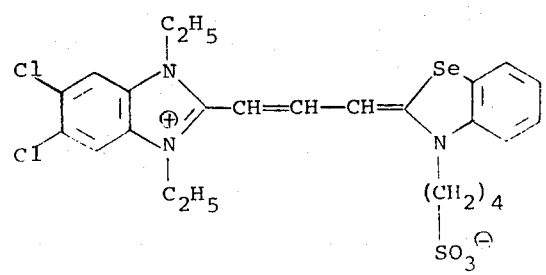

XII. 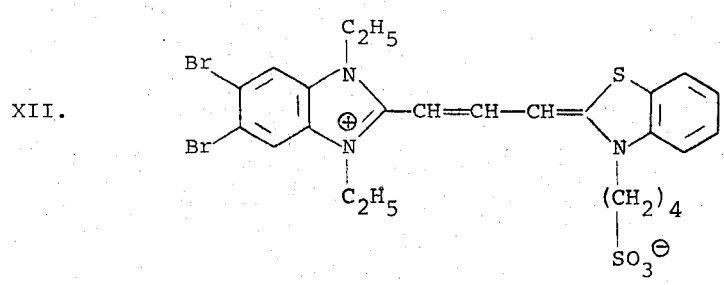
XIII. 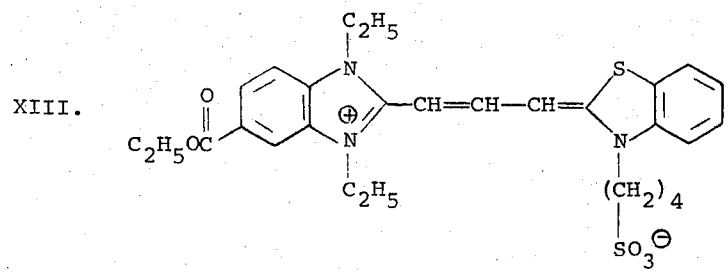
XIV. 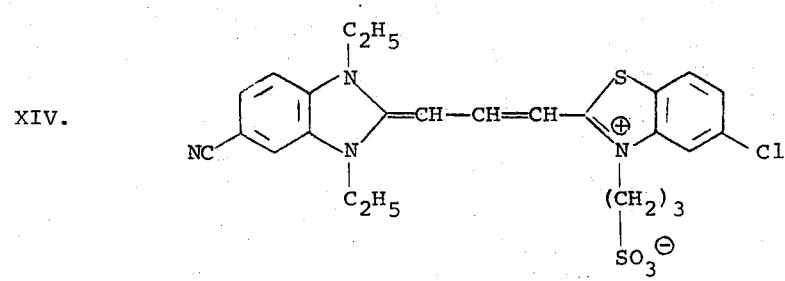
XV. 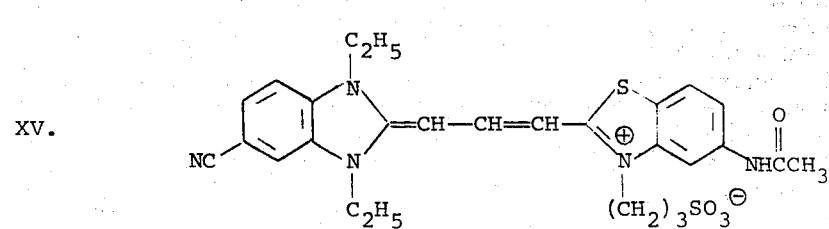
XVI. 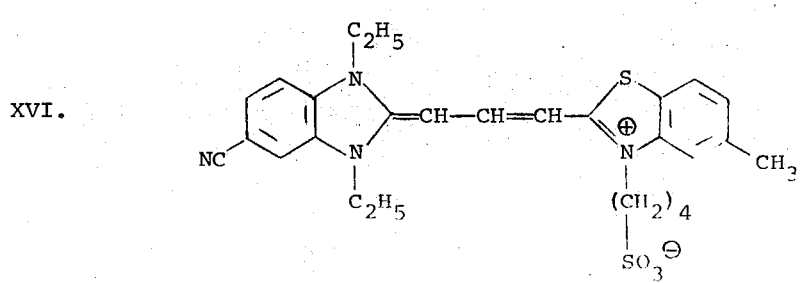
XVII. 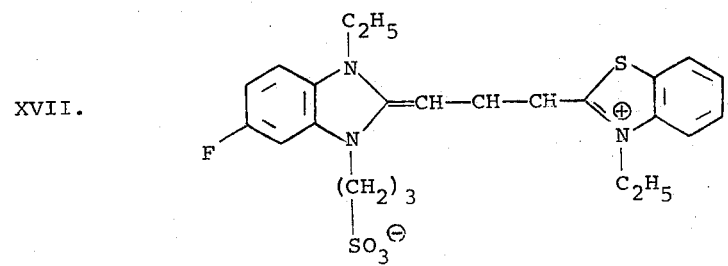

XVIII. 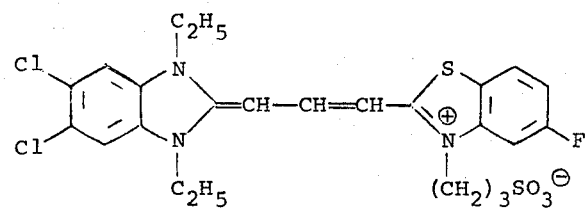

XIX. 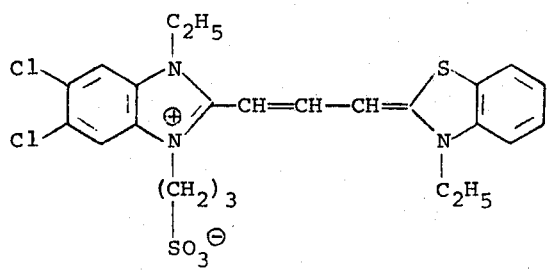

XX. 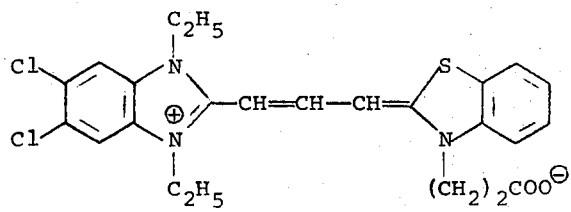

In a representative embodiment of this invention, one or more of the symmetrical benzoxazolocarbocyanine dyes represented by Formula I together with one or more of the unsymmetrical benzimidazolocarbocyanine dyes represented by Formula II are incorporated into a photographic silver halide emulsion. The techniques of incorporating the dye combination of the invention into the silver halide emulsion are substantially similar to that previously outlined with reference to the use of a single sensitizing dye and those disclosed in the art. Each of the dyes may be dissolved, or otherwise distributed, in a suitable medium, such as methanol, trifluoroethanol or pyridine, and appropriate amounts of each medium containing the sensitizing dyes may be slowly in the desired sequence to a flowable silver halide emulsion and stirred or otherwise agitated until said dyes are uniformly dispersed throughout the emulsion. Alternatively, the solutions containing the dyes may be combined before addition to the silver halide emulsion and a single solution of the combined dyes employed.

The concentrations and relative proportions of the sensitizing dyes in the silver emulsion may be varied over wide limits depending upon the characteristics of the particular silver halide emulsion and the sensitizing effect desired. Ordinarily the preferred concentration of the benzoxazolocarbocyanine dyes of Formula I in a silver iodobromide emulsion has been found to be on the order of 0.5 mg per g of silver halide measured as silver, whereas the optimum concentration of the benzimidazolocarbocyanine dyes of Formula II used in combination therewith has been found to be about 1.5 mg per g of silver halide measured as silver. However, as previously mentioned, the concentration of the combination of cyanine dyes of this invention can be changed in total or by varying the proportion of the dyes in the combination. The optimum concentrations and proportions for any particular emulsion or photographic system may be readily determined by routine experimentation which will be readily apparent to one skilled in the art.

The dye combinations of the present invention provide a desirable and uniform extension of the sensitivity of silver halide emulsions into the green region of the spectrum. In addition, the subject dye combination provides green-sensitized silver halide emulsions and photographic elements which have markedly improved shelf-like stability over prior art combinations, and show a minimum of fogging in both fresh and incubated samples. Data showing these advantageous characteristics are set forth in the examples hereinafter.

The photoresponsive material of the photographic emulsion will preferably comprise one or more of the silver halides such as silver chloride, silver iodide, silver bromide, or mixed silver halides such as silver chlorobromide, silver iodobromide, silver chlorobromoiodide, or mixtures thereof, of varying halide ratios and varying silver concentrations.

The silver halide crystals may be prepared by reacting a water-soluble silver salt, such as silver nitrate, with at least one water-soluble halide, such as ammonium, potassium or sodium bromide, preferably together with a corresponding iodide, in an aqueous solution of a peptizing agent such as a colloidal gelatin solution; digesting the dispersion at an elevated temperature, to provide increased crystal growth; washing the resultant dispersion to remove undesirable reaction products and residual water-soluble salts by chilling the dispersion, noodling the set dispersion, and washing the noodles with cold water, or alternatively, employing any of the various flocculation systems or procedures, adapted to effect removal of undesired components; after ripening the dispersion at an elevated temperature in combination with the addition of gelatin and various adjuncts, for example, chemical sensitizing agents; all according to the traditional procedures of the art as described, for example, in Neblette, C. B., *Photography Its Materials And Processes*, 6th Ed., 1962. It is appreciated that the emulsion employed may actually be a blend of two or more emulsions which have been prepared in the manner just described.

As the binder for the emulsion, the aforementioned gelatin may be, in whole or in part, replaced with some other natural colloidal material such as albumin; casein; or zein, or synthetic resins such as cellulose derivatives; polyacrylamides, and vinyl polymers.

Additional optional additives, such as coating aids, hardeners, viscosity-increasing agents, stabilizers, preservatives, and the like, also may be incorporated in the emulsion formulation, according to the conventional procedures known in the photographic emulsion manufacturing art and described in a multiplicity of U.S. and foreign patents. Examples of such optional additives include chemical sensitizers (e.g., reducing agents, sulfur, selenium or tellurium compounds; gold, platinum or palladium compounds, or combinations of these), stabilizers and antifoggants (e.g., noble metal salts such as rubidium, rhodium, palladium, iridium and platinum; mercury compounds; triazoles; azaindenes; disulfides; benzothiazolium compounds; zinc and cadmium salts; mercapto compounds, etc.), speed-increasing compounds (e.g., quaternary ammonium compounds, polyalkylene glycols, thiopolymers and thioethers, cationic surface active agents, or combinations of these), hardening agents (e.g., inorganic agents providing polyvalent metallic atoms such as potash alum and chrome alum; aldehydes such as formaldehyde, glyoxal, mucochloric acid; blocked aldehydes; ketones; quinones; carboxylic and carbonic acid derivatives; sulfonate esters; sulfonyl halides, vinyl sulfones, active halogen compounds; epoxy compounds, aziridines; active olefins, isocyanates, carbodiimides; mixed function hardeners and polymeric hardeners such as oxidized polysaccharides; etc.), coating aids (e.g., saponin; a polyethylene glycol; a polyethylene glycol ether; a taurine; a maleopimarate; an amino acid; a sulfosuccinate; a polyether; a gelatin plasticizer such as glycerin; a dihydroxyalkane; a bisglycolic acid ester; a succinate; a polymeric hydrosol; silicone resins; alkyl aryl sulfonates; etc.), auxiliary developing agents (e.g., hydroquinones such as 4'-methylphenylhydroquinone, catechols, aminophenols, 3-pyrazolidone, ascorbic acid and its derivatives, reductones and phenylenediamines, or combinations of developing agents); and the like.

The emulsion may be coated onto various types of rigid or flexible supports, for example, glass, paper, metal, polymeric films of both the synthetic types and these derived from naturally occuring products, etc. Especially suitable materials include paper; aluminum; polymethacrylic acid, methyl and ethyl esters; vinyl chloride polymers; polyvinyl acetals; polyamides such as nylon; polyesters such as the polymeric films derived for ethylene glycol terephthalic acid; polymeric cellulose derivatives such as cellulose acetate, triacetate, nitrate, propionate, butyrate, acetate-butyrate, or acetate-propionate; polycarbonates; polystyrenes; etc.

The emulsions of this invention can be coated by the various coating procedures in the art such as dip coating, air knife coating, curtain coating, extrusion coating, etc.

Emulsions spectrally sensitized as described herein are useful in a variety of photographic processes, for example, in colloid transfer processes such as described in Yackel et al. U.S. Pat. No. 2,716,059; silver salt diffusion transfer processes such as described in Rott U.S. Pat. No. 2,352,014, Land U.S. Pat. No. 2,543,181, Yackel U.S. Pat. No. 3,020,155 and Land U.S. Pat. No. 2,861,885; color image transfer processes such as described in Rogers U.S. Pat. Nos. 3,087,817; 3,185,567; and 2,983,606; Weyerts U.S. Pat. No. 3,253,915; Whitmore et al. U.S. Pat. Nos. 3,227,550; 3,227,551; and 3,227,552; and Land U.S. Pat. Nos. 3,415,644; 3,415,645; 3,415,646; and imbibition transfer processes as described in Minsk U.S. Pat. No. 2,882,156.

As previously mentioned, the present invention has especially useful employment in subtractive color photographic diffusion transfer processes and products, particularly those color processes which employ dye developers, i.e., compounds possessing the properties of both a dye and a photographic silver halide developing agent. Such processes and products are well known to the photographic art and are disclosed in a multiplicity of U.S. and foreign patents.

Generally speaking, diffusion transfer systems rely for color image formation upon a differential in mobility or solubility of a dye image-providing material obtained as a function of development of exposed silver halide so as to provide an imagewise distribution of such material which is more diffusible and which is therefore selectively transferred, at least in part, by diffusion, to a superposed dyeable stratum to impart thereto the desired color transfer image. The differential in mobility or solubility may, for example, be obtained by a chemical action such as a redox reaction or a coupling reaction.

In any of these systems, multicolor images are obtained by employing a film unit containing at least two selectively sensitized silver halide emulsions each having associated therewith a dye image-providing material exhibiting desired spectral absorption characteristics. The most commonly employed elements of this type are the so-called tripack structures employing a blue-, a green- and a red-sensitive silver halide layer having associated therewith, respectively, a yellow, a magenta and a cyan dye image-providing material. The dye combination of the present invention, as previously indicated, is useful in providing the green-sensitive emulsion of these photographic elements.

Multicolor images may be obtained using the previously mentioned dye developers by several techniques. One such technique contemplates obtaining multicolor transfer images utilizing dye developers by employment of an integral multilayer photosensitive element, such as is disclosed in the aforementioned U.S. Pat. No. 2,983,606, and particularly with reference to FIG. 9 of the patent's drawing, wherein at least two selectively sensitized photosensitive strata, superposed on a single support, are processed, simultaneously and without separation, with a single, common image-receiving layer. Other techniques require the separation of the image-receiving layer from the remainder of the film unit in order to view the image.

A suitable arrangement for the photosensitive element comprises a support carrying a red-sensitive silver halide stratum, a green-sensitive silver halide emulsion stratum and a blue-sensitive silver halide emulsion stratum, said emulsions having associated therewith, respectively, for example, a cyan dye developer, a magenta dye developer and a yellow dye developer. The dye developer may be utilized in the silver halide emulsion layer, for example, in the form of particles, or it may be employed as a layer behind the appropriate silver halide emulsion strata. Each set of silver halide emulsion and associated dye developer strata are disclosed to be optionally separated from other sets by suitable interlayers, for example, by a layer of gelatin or polyvinyl alcohol.

The dye developers associated with the green-sensitive emulsion in the film unit of the present invention are dye image-forming materials which are preferably selected for their ability to provide a color that is useful in carrying out subtractive color photography, that is, the previously mentioned magenta color. The magenta dye developer employed may be incorporated in the silver halide emulsion or, in the preferred embodiment, in a separate layer behind the silver halide emulsion. Such a layer of dye developer may be applied by use of a coating solution about 0.5 to 8% by weight of the dye developer dispersed in a film-forming natural, or synthetic, polymer, for example, gelatin, polyvinyl alcohol, and the like, adapted to be permeated by the chosen diffusion transfer fluid processing composition.

An extensive compilation of specific dye developers particularly adapted for employment in photographic diffusion transfer processes is set forth in aforementioned U.S. Pat. No. 2,983,606 and in the various copending U.S. applications referred to in that patent, especially in the table of U.S. applications incorporated by reference into the patent as detailed in column 27. As examples of additional U.S. patents detailing specific magenta dye developers contemplated for employment in the present invention, mention may also be made of U.S. Pat. Nos. 3,134,672; 3,218,164; 3,563,739; and the like.

Image-receiving elements, particularly adapted for employment in the preceding diffusion transfer processes, comprise a support layer possessing on one surface thereof, in sequence, a polymeric acid layer, preferably an inert timing or spacer layer, and an image-receiving layer adapted to provide a visible image upon transfer to said layer of diffusible dye image-forming substance, such as disclosed in, for example U.S. Pat. No. 3,362,819.

It will be apparent that, by appropriate selection of the image-receiving element materials from among suitable known opaque and transparent materials, it is possible to obtain either a colored positive reflection print or a colored positive transparency.

As disclosed in the previously cited patents, the liquid processing composition referred to for effecting multicolor diffusion transfer processes comprises at least an aqueous solution of an alkaline material, for example, diethylamine, sodium hydroxide or sodium carbonate and the like, and preferably possessing a pH in excess of 10, and most preferably, a viscosity-increasing compound constituting a film-forming material of the type which, when the composition is spread and dried, forms a relatively firm and relatively stable film. It will be noted that the liquid processing composition employed may also contain one or more auxiliary or accelerating developing agents, such as p-methylaminophenol, 2,4-diaminophenol, p-benzylaminophenol, hydroquinone, toluhydroquinone, phenylhydroquinone, 4'-methylphenylhydroquinone, etc. Such auxiliary developing agents may be employed in the liquid processing composition or they may be initially incorporated, at least in part, in any one or more of the silver halide emulsion strata, the strata containing the dye developers, the interlayers, the overcoat layer, the image-receiving layer, or in any other auxiliary layer, or layers, of the film unit. It will also be apparent that the relative proportions of the agents of the diffusion transfer processing composition may be altered to suit the requirements of the operator. Thus, it is within the scope of this invention to modify the herein described developing compositions by the substitution of preservatives, alkalies, silver halide solvents, etc., other than those specifically mentioned, and include in the developing composition components such as restrainers, accelerators, etc.

Although the invention has been discussed in detail throughout employing dye developers, the preferred dye image-forming materials, it will be readily recognized that other, less preferred, dye image-providing materials may be substituted in replacement of the preferred dye developers in the practice of the invention. For example, there may be employed dye image-forming materials such as those disclosed in U.S. Pat. Nos. 2,647,049; 2,661,293; 2,698,244; 2,698,798; and 2,802,735, wherein color diffusion transfer processes are described which employ color coupling techniques comprising, at least in part, reacting one or more color developing agents and one or more color formers or couplers to provide a dye transfer image to a superposed image-receiving layer and those disclosed in U.S. Pat. No. 2,774,668 wherein color diffusion transfer processes are described which employ the imagewise differential transfer of complete dyes by the mechanisms therein described to provide a transfer dye image to a contiguous image-receiving layer.

The present invention will be illustrated in greater detail in conjunction with the following examples. The present invention, however, is not to be interpreted as being limited to the details set forth therein.

EXAMPLE I

A dye within Formula I possessing the formula:

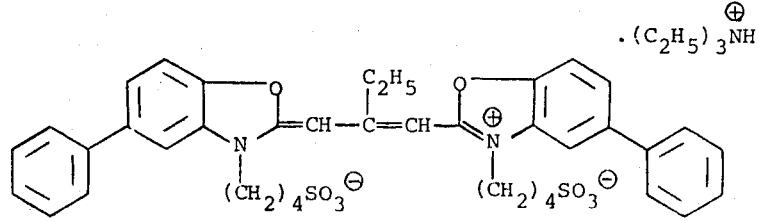

XXI.

was prepared by dissolving 5.0 g. (0.145 mole) of 2-methyl-3-(4'-sulfobutyl)-5-phenylbenzoxazolium betaine in 20 ml. of phenol at a temperature of 110°. To this solution was added 2.8 g. (0.0145 mole + 10% excess) of triethyl orthopropionate and 3.3 g. (0.0290 mole + 10% excess) or triethylamine. The solution was stirred for 2 minutes and then an additional 5.0 g. (0.0145 mole) of the betaine was added. This solution was stirred at 110°–115° for 40 minutes, cooled and 150 ml. of methanol added. This solution was cooled in a dry ice bath and 800 ml. of diethyl ether was added to precipitate a viscous solid. The ether was decanted and the solid was dissolved in 200 ml. of methanol with heating on a steam bath and filtered. This solution was again cooled in a dry ice bath and diethyl ether was slowly added until precipitation began. A total of 200 ml. of ether was added slowly and the orange solid which precipitated was filtered off and vacuum dried to yield 6.0 g. (51%) of 9-ethyl-5,5'-diphenyl-3,3'-bis(4''-sulfobutyl)-benzoxazolocarbocyanine triethyl ammonium salt.

8.5 g. of dye prepared as stated was dissolved in 150 ml. of boiling isopropanol, filtered and cooled in the refrigerator overnight. 7.3 g. (86%) of recrystallized dye was filtered off and vacuum dried. The recrystallized dye exhibited a Molar extinction coefficient of 163,500 with a $\lambda_{max}$ at 504 m$\mu$ in methanol, and an elemental analysis as follows:

|  | C | H | N | O | S |
|---|---|---|---|---|---|
| Found: | 61.62 | 6.69 | 4.51 | 19.78 | 7.51 |
| Theory: | 61.30 | 6.91 | 4.76 | 19.91 | 7.62 |

EXAMPLE II

A dye within Formula II possessing the Formula V above, i.e.:

was prepared by refluxing a well-stirred mixture of 113.0 g. (0.21 mole) of 1,3-diethyl-2-[β(p-tolusulfoanilido)vinyl]-5,6-dichlorobenzimidazolium chloride, 50.3 g. (0.18 mole) of anhydro-2-methyl-3(4'-sulfobutyl)benzothiazolium hydroxide, and 36.4 g. (0.36 mole) of triethylamine in 550 ml. of 2-methoxyethanol for 45 minutes. At the end of this time, the reaction mixture was cooled to room temperature and the crude dye was removed by suction filtration. This crude dye was refluxed with two 400 ml. portions of methyl cellosolve for thirty minutes to remove dye impurities and by-products. This dye was finally washed thoroughly with ethanol and then dried in vacuo at 70° C. overnight over Drierite. There was obtained 72.0 g. (74%) of anhydro-5,6-dichloro-1,3-diethyl-3'-(4''-sulfobutyl)-benzimidazolothiacarbocyanine hydroxide possessing a m.p. at 300° C. and exhibiting a $\lambda_{max}$ at 525 m$\mu$ in Methyl Cellosolve, and an elemental analysis as follows:

|  | C | H | N | S | Cl | O |
|---|---|---|---|---|---|---|
| Found: | 54.32 | 4.75 | 7.51 | 11.81 | 12.91 | 8.68 |
| Theory: | 54.34 | 4.92 | 7.61 | 11.56 | 12.84 | 8.69 |

EXAMPLE III

For the purposes of illustrating the advantageous photographic utilization of the present invention, the sensitization provided by a combination of dyes within the scope of this invention was compared with the sensitization provided by a combination of dyes described in the prior art, for example, in U.S. Pat. No. 3,799,783.

The two dyes prepared in Examples I and II above were employed, in combination, to sensitize a test gelatino-silver iodobromide emulsion in accordance with the general procedure previously set forth. About 0.5 mg. of the benzoxazolocarbocyanine dye of Formula XXI and 1.5 mg. of the benzimidazolothiacarbocyanine dye of Formula V per gram of silver halide measured as silver was added to the emulsion from a methanol medium. To serve as control, a portion of the same emulsion was sensitized with prior art combination of dyes comprising 0.5 mg. of 5,5',6,6'-tetrachloro-1,1'-diethyl-3,3'-bis(γsulfopropyl)benzimidazolocarbocyanine betaine sodium salt; 0.4 mg. of 3-carboxymethyl-1'-ethylthia-2'-cyanine betaine and 0.8 mg. of 3-carboxymethyl-1'-ethyl-5,6'-dimethoxythia-2'-cyanine betaine per gram of silver halide measured as silver.

The above-described test and control emulsions were then respectively included in identical multicolor photosensitive elements which were prepared by coating, in succession, on a gelatin-subbed, opaque polyester film base, the following layers:

1. a layer comprising the cyan dye developer:

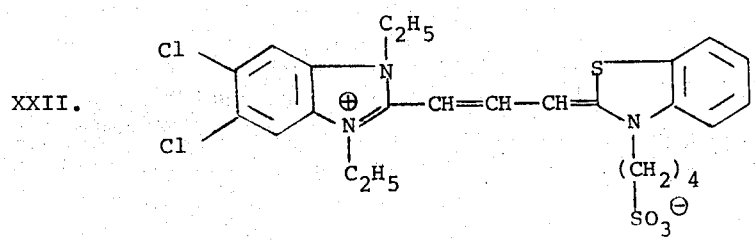

XXII.

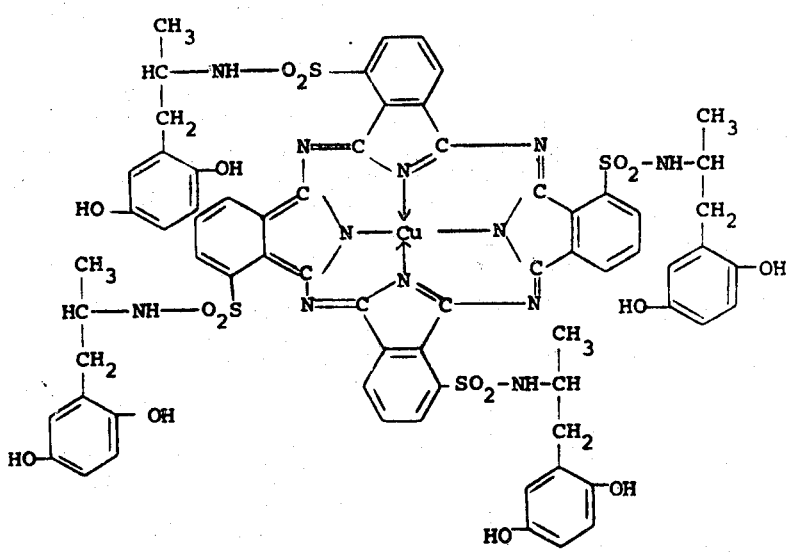

dispersed in gelatin and coated at a coverage of about 69 mgs./ft.² of dye and about 98 mgs./ft.² of gelatin;

2. a red-sensitive gelatino silver iodobromide emulsion layer coated at a coverage of about 140 mgs./ft.² of silver and about 61 mgs./ft.² of gelatin;

3. an interlayer of a 60-30-4-6 copolymer of butylacrylate, diacetone acrylamide, styrene and methacrylic acid, plus about 2.4% by weight of polyacrylamide permeator, coated at about 180 mgs./ft.² of total solids;

4. a layer comprising the magenta dye developer:

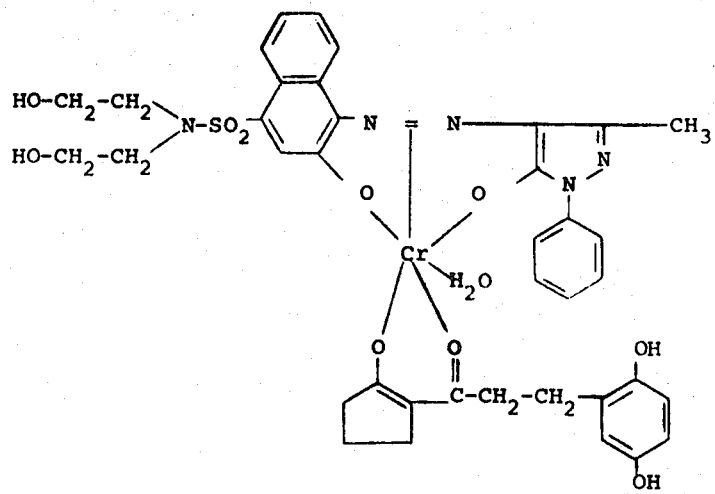

dispersed in gelatin and coated at a coverage of about 75 mgs./ft.² of dye and about 66 mgs./ft.² of gelatin;

5. a layer of the test or control green-sensitive gelatino silver iodobromide emulsion as prepared above coated at a coverage of about 80 mgs./ft.² of silver and about 85 mgs./ft.² of gelatin;

6. a layer containing the copolymer referred to above in layer 3 plus about 7.8% polyacrylamide coated at about 107 mgs./ft.² of total solids; and also containing succindialdehyde as a hardener at about 9.8 mgs./ft.²;

7. a layer comprising the yellow dye developer:

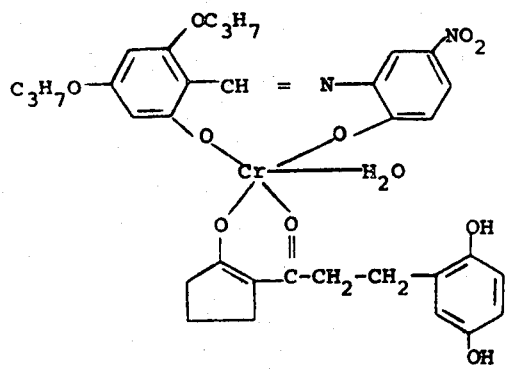

dispersed in gelatin and coated at a coverage of about 83 mgs./ft.² of dye and about 58 mgs./ft.² of gelatin;

8. a blue-sensitive gelatino silver iodobromide emulsion layer coated at a coverage of about 120 mgs./ft.² of silver and about 53 mgs./ft.² of gelatin, plus about 30 mgs./ft.² of 4'-methylphenylhydroquinone and 34 mgs./ft.² of gelatin;

9. a gelatin overcoat layer coated at a coverage of about 40 mgs./ft.² of gelatin.

Image-receiving elements were prepared by coating the following layers in succession on a cellulose acetate-butyrate subcoated baryta paper support, said layers respectively comprising the following major ingredients:

1. a mixture of about 8 parts, by weight, of a partial butyl ester of polyethylene/maleic anhydride and about 1 part, by weight, of polyvinyl butyral resin (Butvar, Shawinigan Products, New York, N.Y.) to form a polymeric acid layer approximately 0.6 to 0.9 mils thick;

2. a mixture of about 7 parts, by weight, of hydroxypropyl cellulose (Klucel, J12HB, Hercules, Inc., Wilmington, Del.), and about 4 parts, by weight, of polyvinyl alcohol; to form a spacer layer approximately 0.30 to 0.37 mils thick; and 3. a mixture of about 2 parts of polyvinyl alcohol and 1 part of poly-4-vinylpyridine to form an image-receiving layer approximately 0.35 to 0.45 mils thick, also containing an equimolar mixture of the cis- and trans isomers of 4,5-cyclopentahexahydropyrimidine-2-thione (described in U.S. Pat. No. 3,785,813, issued Jan. 15, 1974) as a development restraining reagent, and hardened by a condensate of acrolein and formaldehyde.

A rupturable container comprising an outer layer of lead foil and an inner liner or layer of polyvinyl chloride retaining an aqueous alkaline solution comprising the following basic formulation:

| | | |
|---|---|---|
| Potassium hydroxide (pellets of 85% KOH) | 10.35 | g. |
| Sodium carboxymethyl cellulose (Hercules Type 7H4F) | 3.00 | g. |
| N-phenethyl-α-picolinium bromide | 2.07 | g. |
| Benzotriazole | 3.15 | g. |
| 5-bromo-6-methyl-4-azabenzimidazole | 0.40 | g. |
| 6-methyl uracil | 0.70 | g. |
| Bis-(β-aminoethyl)-sulfide | 0.09 | g. |
| Zinc nitrate | 0.50 | g. |
| Potassium iodide | 0.0018 | g. |
| Lithium nitrate | 0.45 | g. |
| Water | 100 | ml. | was affixed to the leading edge of the film units such that upon application of compressive pressure to the container, its contents were distributed, upon rupture of the container's marginal seal, between the surface layers of the photosensitive and receiving elements.

The above-described film units were exposed in a conventional wedge spectrograph and processed at room temperature (about 75° F.) by spreading the processing composition between the elements as they were brought into superposed relationship between a pair of pressure-applying rollers. The resultant spectrograms detailed essentially the same sensitivities for both test and control units in the green region of the spectrum, i.e., from about 500 nm to about 600 nm. The attached drawing is a graphic representation of the sensitivity imparted to both test and control dye combinations as detailed on the spectrograms. The green speed measured for test and control film units was also essentially equivalent.

Test and control film units prepared as described above were also bagged in foil, without dessicant, and stored at 75° F., 45% relative humidity for 6 months to determine shelf-life stability. Reflection densities to green light were measured by a densitometer on positives from both test and control film units, before and after the 6-month storage period. Processing was conducted at 75° F. and 95° F. with an imbibition period of 60 seconds, and also conducted at 55° F. with an imbibition period of 120 seconds. Characteristic H and D curves were plotted relating the logarithm of the original exposure of the negatives to the measured reflection densities of the positives. The following Table 1 summarizes the changes in maximum green density (green $D_{max}$) and the log exposure valve determined at a green density of 0.60 (green speed) for both test and control film units processed at the specified temperature after storage for 6 months:

TABLE 1

| Film Unit | Processing Temperature | Changes in: | |
|---|---|---|---|
| | | Green $D_{max}$ | Green Speed |
| Test | 75° | −.09 | +.01 |
| Control | do. | −.27 | +.07 |
| Test | 95° | −.13 | +.03 |
| Control | do. | −.38 | +.07 |
| Test | 55° | +.05 | −.01 |
| Control | do. | −.10 | +.01 |

The data set forth above show that the novel combination of dyes of the present invention not only imparts desirable green sensitivity to silver halide emulsions, but also has a profound stabilizing effect on the green-sensitive emulsion, particularly in the presence of dye developers. Specifically, it can be seen from Table 1 that the emulsion sensitized in accordance with this invention shows, over a wide temperature range, only about one-third the $D_{max}$ degradation and negligible speed change over the storage period when compared to emulsions employing prior art sensitizers. Needless to say, the extended shelf-life provided by the combination of dyes of this invention has significant advantages in commercial photographic products.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photosensitive silver halide emulsion spectrally sensitized with a dye combination comprising:
a symmetrical benzoxazolocarbocyanine dye of the formula:

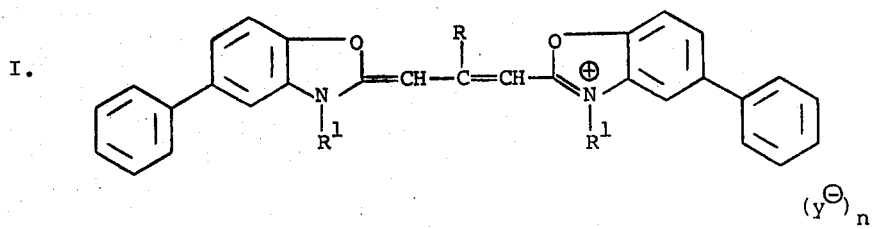

wherein R represents hydrogen or a lower alkyl group possessing from 1 to 3 carbon atoms, inclusive; and each $R^1$ represents a carboxyalkyl or sulfoalkyl group possessing from 1 to 4 carbon atoms, inclusive, in the alkylene chain; Y represents an anion; and n represents 0 or 1, with $n=0$ in the inner salt form of the dye; and an unsymmetrical benzimidazolocarbocyanine dye of the formula:

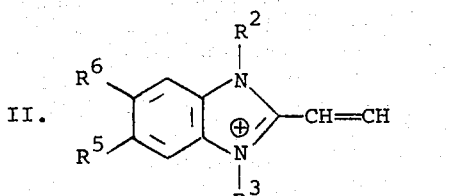

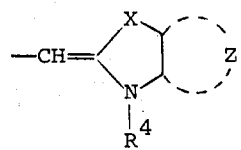

wherein Y and n possess the same meaning as in Formula I; X is S or Se; $R^2$ is a lower alkyl group possessing from 1 to 3 carbon atoms inclusive; $R^3$ and $R^4$ are the same or different and represent a carboxyalkyl or sulfoalkyl group, each possessing from 1 to 4 carbon atoms, inclusive, in the alkylene chain, or a lower alkyl group, with at least one of $R^3$ and $R^4$ being said carboxyalkyl or sulfoalkyl group; $R^5$ is halogen, cyano, or lower carboxyalkyl; $R^6$ is hydrogen or halogen; and Z represents the non-metallic atoms necessary to complete a benzothiazole or benzoselenazole nucleus.

2. A photosensitive silver halide emulsion as defined in claim 1 wherein Z is a benzothiazole nucleus having a halogen lower alkyl, lower carbalkoxy, acetamido or lower alkoxy substituent in the 5-position thereon.

3. A photosensitive silver halide emulsion as defined in claim 1 wherein said symmetrical benzoxazolocarbocyanine dye is a dye of the formula:

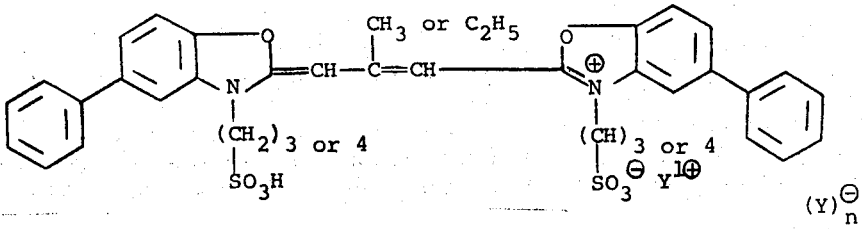

wherein $Y^1$ is a cation or hydrogen.

4. A photosensitive silver halide emulsion as defined in claim 3 wherein $n=0$ and said symmetrical benzoxazolocarbocyanine dye is:

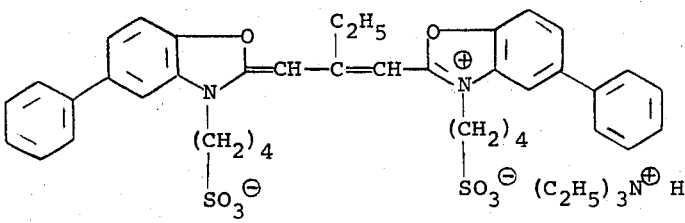

9-ethyl-5,5'-diphenyl-3,3'-(4''-sulfobutyl)-benzoxazolocarbocyanine triethyl ammonium salt.

5. A photosensitive silver halide emulsion as defined in claim 1 wherein said unsymmetrical benzimidazolocarbocyanine dye is a dye of the formula:

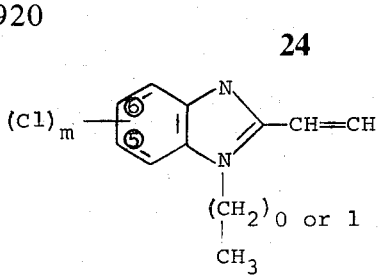

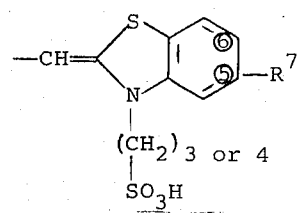

wherein $m$ is 1 or 2 and the Cl is in the position 5-, or 5- and 6-; and $R^7$ is hydrogen, lower alkyl or lower alkoxy.

6. A photosensitive silver halide emulsion as defined in claim 5 wherein $n=0$ and said benzimidazolocarbocyanine dye is:

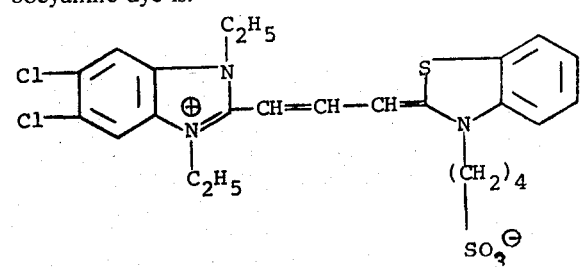

anhydro-5,6-dichloro-1,3-diethyl-3'-(4''-sulfobutyl)-benzimidazolothiacarbocyanine hydroxide.

7. A photosensitive silver halide emulsion as defined in claim 1 wherein said combination comprises 9-ethyl-5,5'-diphenyl-3,3'-(4''-sulfobutyl)-benzoxazolocarbocyanine triethyl ammonium salt, and anhydro-5,6-dichloro-1,3-diethyl-3'-(4''-sulfobutyl)-benzimidazolothiacarbocyanine hydroxide.

8. A photosensitive silver halide emulsion as defined in claim 1 having associated therewith a dye which is a silver halide developing agent.

9. A photosensitive silver halide emulsion as defined in claim 8 wherein said dye is a magenta dye developer.

10. A photosensitive element comprising a support having thereon at least one layer containing a photosensitive silver halide emulsion of claim 1.

11. A photosensitive element comprising a support having thereon at least one layer containing a photosensitive silver halide emulsion of claim 7.

* * * * *